United States Patent
Yoakim et al.

(10) Patent No.: US 9,603,479 B2
(45) Date of Patent: Mar. 28, 2017

(54) CAPSULE FOR PREPARING A BEVERAGE OR LIQUID FOOD AND SYSTEM USING BREWING CENTRIFUGAL FORCE

(71) Applicant: NESTEC S.A., Vevey (CH)

(72) Inventors: Alfred Yoakim, St-Légier-la-Chiésaz (CH); Jean-Paul Denisart, La Conversion (CH); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 329 days.

(21) Appl. No.: 14/334,082

(22) Filed: Jul. 17, 2014

(65) Prior Publication Data
US 2014/0360377 A1 Dec. 11, 2014

Related U.S. Application Data

(62) Division of application No. 12/602,730, filed as application No. PCT/EP2008/054810 on Apr. 21, 2008, now Pat. No. 8,813,634.

(30) Foreign Application Priority Data

Jun. 5, 2007 (EP) .................................. 07109579
Jun. 5, 2007 (EP) .................................. 07109580
(Continued)

(51) Int. Cl.
A47J 31/00 (2006.01)
A47J 31/22 (2006.01)
(Continued)

(52) U.S. Cl.
CPC ............. *A47J 31/22* (2013.01); *A47J 31/407* (2013.01); *B65D 85/8043* (2013.01)

(58) Field of Classification Search
CPC . A47J 31/22; A47J 31/20; A47J 31/06; B65D 85/8043; B65D 85/8085; B65D 85/812
(Continued)

(56) References Cited

U.S. PATENT DOCUMENTS 239,659 A 4/1881 Houston .......................... 494/37
1,963,476 A 6/1934 Smith ............................ 210/337
(Continued)

FOREIGN PATENT DOCUMENTS

AT 197553 B 5/1958
BE 894031 A1 2/1983
(Continued)

OTHER PUBLICATIONS

U.S. Appl. No. 12/602,542, Non-Final Office Action, Jan. 13, 2015.
(Continued)

*Primary Examiner* — Reginald L Alexander
(74) *Attorney, Agent, or Firm* — Winston & Strawn LLP

(57) ABSTRACT

A capsule for preparing a beverage or liquid food from a substance, in a centrifugal brewing unit, by passing water through the substance contained in the capsule by using brewing centrifugal forces. The capsule includes an enclosure containing a predetermined dose of substance, an opening member which opens the capsule under the centrifugal effect to allow the brewed liquid to leave the capsule. The capsule may also include externally driving the capsule in a centrifugal brewing device wherein the capsule includes a structure configured to offer resistance to torque during rotation of the capsule for maintaining the capsule in a reference rotational position.

22 Claims, 14 Drawing Sheets

(30) Foreign Application Priority Data

| Feb. 29, 2008 | (EP) | 08102147 |
|---|---|---|
| Feb. 29, 2008 | (EP) | 08102148 |
| Feb. 29, 2008 | (EP) | 08102149 |

(51) Int. Cl.
  *B65D 85/804* (2006.01)
  *A47J 31/40* (2006.01)

(58) Field of Classification Search
  USPC .......... 99/302 C, 287, 295; 426/77, 115
  See application file for complete search history.

(56) References Cited

U.S. PATENT DOCUMENTS

| | | | |
|---|---|---|---|
| 2,778,739 A | 1/1957 | Rodth | 426/77 |
| 2,899,886 A | 8/1959 | Rodth | 99/295 |
| 2,952,202 A | 9/1960 | Renner et al. | 99/289 R |
| 3,025,781 A | 3/1962 | Bossi | 99/302 C |
| 3,233,535 A | 2/1966 | Fowlie | 99/289 R |
| 3,269,298 A | 8/1966 | Grundmann | |
| 3,566,770 A | 3/1971 | Crossley | 99/289 R |
| 3,654,852 A | 4/1972 | Rosan, Sr. | 99/323 |
| 3,812,773 A | 5/1974 | Hultsch | 99/290 |
| 3,822,013 A | 7/1974 | Van Der Veken | 206/223 |
| 3,967,546 A | 7/1976 | Cailliot | 99/286 |
| 3,985,069 A | 10/1976 | Cavalluzzi | 99/295 |
| 4,136,202 A | 1/1979 | Favre | 426/77 |
| 4,426,919 A | 1/1984 | Rhoten | 99/289 T |
| 4,464,982 A | 8/1984 | Leuschner et al. | 99/287 |
| 4,473,002 A | 9/1984 | Leuschner et al. | 99/302 C |
| 4,545,296 A | 10/1985 | Ben-Shmuel | 99/289 P |
| 4,584,101 A | 4/1986 | Kataoka | 201/474 |
| 4,806,375 A | 2/1989 | Favre | 426/433 |
| 4,846,052 A | 7/1989 | Favre et al. | 99/295 |
| 4,859,337 A | 8/1989 | Woltermann | 210/474 |
| 4,962,693 A * | 10/1990 | Miwa | A47J 31/42 99/283 |
| 4,996,066 A | 2/1991 | Love et al. | |
| 5,047,252 A | 9/1991 | Liu et al. | 426/79 |
| 5,265,517 A | 11/1993 | Gilbert | 99/280 |
| 5,300,308 A | 4/1994 | Louridas | 426/112 |
| 5,325,765 A | 7/1994 | Sylvan et al. | 99/295 |
| 5,343,799 A | 9/1994 | Fond | 99/295 |
| 5,566,605 A | 10/1996 | Lebrun et al. | 99/302 |
| 5,637,335 A | 6/1997 | Fond et al. | 426/84 |
| 5,649,472 A | 7/1997 | Fond et al. | 99/295 |
| 5,656,311 A | 8/1997 | Fond | 426/84 |
| 5,755,149 A | 5/1998 | Blanc et al. | 99/289 T |
| 5,773,067 A | 6/1998 | Freychet et al. | 426/506 |
| 5,826,492 A | 10/1998 | Fond et al. | |
| 5,948,455 A | 9/1999 | Schaeffer et al. | 426/77 |
| 6,007,853 A | 12/1999 | Lesser | 426/77 |
| 6,607,762 B2 | 8/2003 | Lazaris et al. | 426/79 |
| 6,777,007 B2 | 8/2004 | Cai | 426/78 |
| 6,786,134 B2 | 9/2004 | Green | 99/289 P |
| 6,849,285 B2 | 2/2005 | Masek et al. | 426/112 |
| 6,854,378 B2 | 2/2005 | Jarisch et al. | 99/295 |
| 7,017,775 B2 | 3/2006 | Zettle et al. | 220/781 |
| 7,153,530 B2 | 12/2006 | Masek et al. | 426/77 |
| 7,216,582 B2 | 5/2007 | Yoakim et al. | 99/295 |
| 7,325,478 B2 | 2/2008 | Cautenet et al. | 92/187 |
| 7,325,479 B2 | 2/2008 | Laigneau et al. | 99/295 |
| 7,469,627 B2 | 12/2008 | Li | 99/286 |
| 7,569,242 B2 | 8/2009 | Barber et al. | 426/292 |
| 7,569,243 B2 | 8/2009 | Yoakim et al. | 426/433 |
| 7,770,512 B2 | 8/2010 | Albrecht | 99/295 |
| 7,981,451 B2 | 7/2011 | Ozanne | 426/79 |
| 8,151,694 B2 | 4/2012 | Jacobs et al. | 99/302 R |
| 8,307,754 B2 | 11/2012 | Ternite et al. | |
| 8,327,754 B2 | 12/2012 | Kirschner et al. | 99/295 |
| 8,409,646 B2 | 4/2013 | Yoakim et al. | 426/115 |
| 8,431,175 B2 | 4/2013 | Yoakim et al. | 426/433 |
| 8,512,784 B2 | 8/2013 | Denisart et al. | 426/433 |
| 8,813,834 B2 | 8/2014 | Chin | |
| 2003/0116029 A1 | 6/2003 | Kollep | 99/279 |
| 2003/0145736 A1 | 8/2003 | Green | 99/280 |
| 2003/0159593 A1 | 8/2003 | Leutwyler | 99/348 |
| 2003/0189872 A1 | 10/2003 | Artman et al. | |
| 2004/0255790 A1 | 12/2004 | Green | 99/279 |
| 2005/0150390 A1 | 7/2005 | Schifferle | 99/295 |
| 2005/0188854 A1 | 9/2005 | Green et al. | 99/275 |
| 2006/0003075 A1 | 1/2006 | Meador | 426/590 |
| 2006/0110507 A1 | 5/2006 | Yoakim et al. | 426/433 |
| 2006/0196364 A1 | 9/2006 | Kirschner | 99/295 |
| 2006/0236871 A1 | 10/2006 | Ternite et al. | 99/295 |
| 2007/0079708 A1 | 4/2007 | Li | 99/279 |
| 2007/0248734 A1 | 10/2007 | Denisart et al. | 426/569 |
| 2007/0289453 A1 | 12/2007 | Halliday et al. | 99/295 |
| 2008/0014860 A1 | 1/2008 | Heitman et al. | 454/310 |
| 2008/0038414 A1 | 2/2008 | Veciana I Membrado et al. | 426/115 |
| 2008/0122286 A1 | 5/2008 | Brock et al. | |
| 2008/0187638 A1 | 8/2008 | Hansen | 426/433 |
| 2009/0032454 A1 | 2/2009 | Rapparini | 210/337 |
| 2009/0050540 A1 | 2/2009 | Imai et al. | 209/580 |
| 2009/0136639 A1 | 5/2009 | Doglioni Majer | 426/431 |
| 2009/0155422 A1 | 6/2009 | Ozanne | 426/89 |
| 2009/0218877 A1 | 9/2009 | Derman | |
| 2010/0024658 A1 | 2/2010 | Jacobs et al. | 99/302 R |
| 2010/0064899 A1 | 3/2010 | Aardenburg | 99/295 |
| 2010/0108541 A1 | 5/2010 | Roberto | |
| 2010/0173056 A1 | 7/2010 | Yoakim et al. | 426/433 |
| 2010/0178392 A1 | 7/2010 | Yoakim et al. | 426/80 |
| 2010/0178404 A1 | 7/2010 | Yoakim et al. | 426/431 |
| 2010/0186599 A1 | 7/2010 | Yoakim et al. | 99/295 |
| 2010/0203198 A1 | 8/2010 | Yoakim et al. | 426/80 |
| 2010/0203208 A1 | 8/2010 | Yoakim et al. | 426/431 |
| 2010/0239734 A1 | 9/2010 | Yoakim et al. | 426/433 |
| 2011/0041702 A1 | 2/2011 | Yoakim et al. | 99/302 R |
| 2011/0052761 A1 | 3/2011 | Yoakim et al. | 426/77 |
| 2011/0189362 A1 | 8/2011 | Denisart et al. | 426/433 |
| 2011/0217421 A1 | 9/2011 | Perentes et al. | 426/80 |
| 2011/0244099 A1 | 10/2011 | Perentes et al. | 426/431 |
| 2011/0262601 A1 | 10/2011 | Manser et al. | 426/231 |
| 2012/0058226 A1 | 3/2012 | Winkler et al. | 426/79 |

FOREIGN PATENT DOCUMENTS

| | | |
|---|---|---|
| CA | 2625215 A1 | 4/2007 |
| CN | 1656983 A | 8/2005 |
| CN | 101001555 A | 7/2007 |
| DE | 21 51 920 A1 | 4/1973 |
| DE | 32 41 606 A1 | 3/1984 |
| DE | 35 29 053 A1 | 2/1987 |
| DE | 35 29 204 A1 | 2/1987 |
| DE | 37 19 962 C1 | 6/1988 |
| DE | 42 40 429 A1 | 6/1994 |
| DE | 44 39 252 A1 | 5/1996 |
| DE | 103 55 671 A1 | 6/2004 |
| DE | 10 2005 007 852 A1 | 8/2006 |
| EP | 0 242 556 A1 | 10/1987 |
| EP | 0 250 810 A1 | 1/1988 |
| EP | 0 367 600 A1 | 5/1990 |
| EP | 0 512 470 B1 | 11/1992 |
| EP | 0 521 187 A1 | 1/1993 |
| EP | 0 521 510 A1 | 1/1993 |
| EP | 0 607 759 A1 | 7/1994 |
| EP | 0 651 963 B1 | 5/1995 |
| EP | 0 749 713 B1 | 12/1996 |
| EP | 0 806 373 B1 | 11/1997 |
| EP | 1 208 782 B1 | 5/2002 |
| EP | 1 299 022 B1 | 4/2003 |
| EP | 1 654 966 B1 | 5/2006 |
| EP | 1 774 878 A1 | 4/2007 |
| EP | 1 813 333 A2 | 8/2007 |
| EP | 2 000 062 A1 | 12/2008 |
| EP | 2 155 021 B1 | 2/2010 |
| FR | 2 132 310 A1 | 11/1972 |
| FR | 2 487 661 A1 | 2/1982 |
| FR | 2 513 106 A1 | 3/1983 |
| FR | 2 531 849 A1 | 2/1984 |
| FR | 2 535 597 A1 | 5/1984 |
| FR | 2 617 389 A1 | 1/1989 |

(56) References Cited

FOREIGN PATENT DOCUMENTS

| | | |
|---|---|---|
| FR | 2 624 364 A1 | 6/1989 |
| FR | 2 685 186 A1 | 6/1993 |
| FR | 2 686 007 A1 | 7/1993 |
| FR | 2 726 988 A1 | 5/1996 |
| GB | 1 506 074 A | 4/1978 |
| GB | 2 227 405 A | 8/1990 |
| GB | 2 253 336 A | 9/1992 |
| GB | 2 416 480 A | 2/2006 |
| JP | 50-16225 A | 6/1975 |
| JP | 59-82817 A | 5/1984 |
| JP | 62-254719 A | 11/1987 |
| JP | 63-34581 Y2 | 9/1988 |
| JP | 2-124111 A | 5/1990 |
| JP | 2-189114 A | 7/1990 |
| JP | 06-104091 B | 12/1994 |
| JP | 6-339431 A | 12/1994 |
| JP | 3034606 U | 12/1996 |
| JP | 2001-61663 A | 3/2001 |
| JP | 2002-189115 A | 7/2002 |
| JP | 2002-215414 A | 8/2002 |
| JP | 2003-144973 A | 5/2003 |
| JP | 2004-517654 A | 6/2004 |
| JP | 2005-516602 A | 6/2005 |
| JP | 2005-199071 A | 7/2005 |
| JP | 2005-525146 A | 8/2005 |
| JP | 2006-515764 A | 6/2006 |
| JP | 2006-518226 A | 8/2006 |
| JP | 2008-508041 A | 3/2008 |
| JP | 2008-520298 A | 6/2008 |
| TW | 200718383 | 5/2007 |
| WO | 94/02059 A1 | 2/1994 |
| WO | 02/17760 A1 | 3/2002 |
| WO | 02/35977 A1 | 5/2002 |
| WO | 2004/030500 A1 | 4/2004 |
| WO | 2005/066040 A2 | 7/2005 |
| WO | 2006/082064 A1 | 8/2006 |
| WO | 2006/112691 A1 | 10/2006 |
| WO | 2007/014584 A1 | 2/2007 |
| WO | 2007/041954 A1 | 4/2007 |
| WO | 2007/042414 A1 | 4/2007 |
| WO | 2007/085921 A2 | 8/2007 |
| WO | 2007/110768 A2 | 10/2007 |
| WO | 2008/087099 A2 | 7/2008 |
| WO | 2008/148601 A1 | 12/2008 |
| WO | 2008/148604 A1 | 12/2008 |
| WO | 2008/148646 A1 | 12/2008 |
| WO | 2008/148650 A1 | 12/2008 |
| WO | 2008/148656 A1 | 12/2008 |
| WO | 2008/148834 A1 | 12/2008 |
| WO | 2009/050540 A1 | 4/2009 |
| WO | 2009/106175 A1 | 9/2009 |
| WO | 2009/106598 A1 | 9/2009 |
| WO | 2009/133134 A1 | 11/2009 |
| WO | 2010/026045 A1 | 3/2010 |
| WO | 2010/026053 A1 | 3/2010 |
| WO | 2010/038213 A2 | 4/2010 |
| WO | 2010/041179 A2 | 4/2010 |

OTHER PUBLICATIONS

U.S. Appl. No. 12/602,562, Non-Final Office Action, Jul. 17, 2014.
U.S. Appl. No. 12/602,562, Final Office Action, Feb. 11, 2015.
U.S. Appl. No. 12/602,562, Advisory Action, Jul. 13, 2015.
U.S. Appl. No. 12/602,562, Notice of Allowance, Sep. 14, 2015.
U.S. Appl. No. 12/602,577, Notice of Allowance, Nov. 14, 2014.
U.S. Appl. No. 13/061,558, Notice of Allowance, Sep. 26, 2014.
U.S. Appl. No. 12/602,542, filed Dec. 1, 2009.
U.S. Appl. No. 12/602,553, filed Dec. 1, 2009.
U.S. Appl. No. 12/602,562, filed Dec. 1, 2009.
U.S. Appl. No. 12/602,568, filed Dec. 1, 2009.
U.S. Appl. No. 12/602,577, filed Dec. 1, 2009.
U.S. Appl. No. 12/602,730, filed Dec. 2, 2009.
U.S. Appl. No. 12/776,155, filed May 7, 2010.
U.S. Appl. No. 12/856,369, filed Aug. 13, 2010.
U.S. Appl. No. 12/860,705, filed Aug. 20, 2010.
U.S. Appl. No. 13/061,558, filed Mar. 1, 2011.
U.S. Appl. No. 13/061,567, filed Mar. 1, 2011.
Restriction Requirement, U.S. Appl. No. 12/602,542, Feb. 15, 2012.
Non-Final Office Action, U.S. Appl. No. 12/602,542, Apr. 13, 2012.
Final Office Action, U.S. Appl. No. 12/602,542, Oct. 4, 2012.
Advisory Action, U.S. Appl. No. 12/602,542, Feb. 1, 2013.
Non-Final Office Action, U.S. Appl. No. 12/602,542, Jun. 18, 2013.
Final Office Action, U.S. Appl. No. 12/602,542, Jan. 30, 2014.
Restriction Requirement, U.S. Appl. No. 12/602,553, May 11, 2012.
Non-Final Office Action, U.S. Appl. No. 12/602,553, Aug. 23, 2012.
Final Office Action, U.S. Appl. No. 12/602,553, Apr. 11, 2013.
Advisory Action, U.S. Appl. No. 12/602,553, Jul. 23, 2013.
Non-Final Office Action, U.S. Appl. No. 12/602,553, Oct. 8, 2013.
Final Office Action, U.S. Appl. No. 12/602,553, May 8, 2014.
Restriction Requirement, U.S. Appl. No. 12/602,562, Dec. 23, 2011.
Non-Final Office Action, U.S. Appl. No. 12/602,562, Feb. 13, 2012.
Final Office Action, U.S. Appl. No. 12/602,562, Jun. 22, 2012.
Advisory Action, U.S. Appl. No. 12/602,562, Sep. 25, 2012.
Non-Final Office Action, U.S. Appl. No. 12/602,568, Mar. 20, 2012.
Final Office Action, U.S. Appl. No. 12/602,568, Jul. 16, 2012.
Advisory Action, U.S. Appl. No. 12/602,568, Sep. 27, 2012.
Non-Final Office Action, U.S. Appl. No. 12/602,568, Oct. 19, 2012.
Notice of Allowance, U.S. Appl. No. 12/602,568, Feb. 1, 2013.
Non-Final Office Action, U.S. Appl. No. 12/602,577, Mar. 20, 2012.
Final Office Action, U.S. Appl. No. 12/602,577, Jul. 20, 2012.
Advisory Action, U.S. Appl. No. 12/602,577, Oct. 11, 2012.
Non-Final Office Action, U.S. Appl. No. 12/602,577, Nov. 1, 2013.
Non-Final Office Action, U.S. Appl. No. 12/602,577, May 16, 2014.
Non-Final Office Action, U.S. Appl. No. 12/602,730, May 17, 2012.
Final Office Action, U.S. Appl. No. 12/602,730, Sep. 18, 2012.
Advisory Action, U.S. Appl. No. 12/602,703, Jan. 18, 2013.
Non-Final Office Action, U.S. Appl. No. 12/602,730, Dec. 17, 2013.
Notice of Allowance, U.S. Appl. No. 12/602,730, Apr. 29, 2014.
Restriction Requirement, U.S. Appl. No. 12/776,155, Apr. 30, 2012.
Non-Final Office Action, U.S. Appl. No. 12/776,155, Jul. 18, 2012.
Notice of Allowance, U.S. Appl. No. 12/776,155, Mar. 1, 2013.
Restriction Requirement, U.S. Appl. No. 12/856,369, Mar. 15, 2013.
Non-Final Office Action, U.S. Appl. No. 12/856,369, Jul. 30, 2013.
Final Office Action, U.S. Appl. No. 12/856,369, Mar. 10, 2014.
Advisory Action, U.S. Appl. No. 12/856,369, May 9, 2014.
Restriction Requirement, U.S. Appl. No. 12/860,705, Dec. 30, 2011.
Non-Final Office Action, U.S. Appl. No. 12/860,705, Mar. 16, 2012.
Final Office Action, U.S. Appl. No. 12/860,705, Jul. 18, 2012.
Advisory Action, U.S. Appl. No. 12/860,705, Oct. 17, 2012.
Notice of Allowance, U.S. Appl. No. 12/860,705, Nov. 14, 2013.
Restriction Requirement, U.S. Appl. No. 13/061,558, Nov. 13, 2012.
Non-Final Office Action, U.S. Appl. No. 13/061,558, Dec. 6, 2012.
Final Office Action, U.S. Appl. No. 13/061,558, May 21, 2013.
Non-Final Office Action, U.S. Appl. No. 13/061,558, Feb. 14, 2014.
Non-Final Office Action, U.S. Appl. No. 13/061,567, May 10, 2013.
Notice of Allowance, U.S. Appl. No. 13/061,567, Jun. 11, 2013.
Restriction Requirement, U.S. Appl. No. 13/133,613, Mar. 28, 2013.
Non-Final Office Action, U.S. Appl. No. 13/133,613, Jul. 18, 2013.
Final Office Action, U.S. Appl. No. 13/133,613, Mar. 21, 2014.
International Search Report and Written Opinion, Appl. No. PCT/EP2008/054401, Sep. 11, 2008.
International Search Report and Written Opinion, Appl. No. PCT/EP2008/054810, Oct. 24, 2008.
International Search Report and Written Opinion, Appl. No. PCT/EP2008/056310, Oct. 8, 2008.
International Search Report and Written Opinion, Appl. No. PCT/EP2008/056345, Oct. 1, 2008.
International Search Report and Written Opinion, Appl. No. PCT/EP2008/056412, Sep. 11, 2008.
International Search Report and Written Opinion, Appl. No. PCT/EP2008/056968, Oct. 7, 2008.
International Search Report, Appl. No. PCT/EP2009/060697, Feb. 9, 2010.
International Search Report, Appl. No. PCT/EP2009/060771, Feb. 8, 2010.

(56) References Cited

OTHER PUBLICATIONS

European Search Report, Appl. No. EP 09174573, Apr. 9, 2010.
Chilean Appl. No. 1652-2008 filed Jun. 5, 2008 (English equivalent US 2010/0173056 and WO 2008/148601).
Chilean Appl. No. 1653-2008 filed Jun. 5, 2008 (English equivalent US 2010/0186599 and WO 2008/148604).
Chilean Appl. No. 1655-2008 filed Jun. 5, 2008 (English equivalent US 2010/0178404 and WO 2008/148646).
BE 894031 Machine translation: accessed from EPO Jul. 10, 2012.
DE 4240429 Machine translation: accessed from EPO Jul. 10, 2012.
Green Mountain Coffee, New K-Cup Samplers Offer More Variety, Jul. 11, 2008, pp. 1-5. Accessed Mar. 6, 2012, http://www.greenmountaincafe.com/2008/07/new-k-cup-samplers-offer-more-variety/.

* cited by examiner

CAPSULE FOR PREPARING A BEVERAGE OR LIQUID FOOD AND SYSTEM USING BREWING CENTRIFUGAL FORCE

CROSS-REFERENCE TO RELATED APPLICATIONS

This application is a divisional of U.S. application Ser. No. 12/602,730 filed Dec. 2, 2009, which is the U.S. National Stage of PCT/EP2008/054810 filed Apr. 21, 2008, which in turn claims priority to European patent applications EP 07109579.8 filed Jun. 5, 2007, EP 07109580.6 filed Jun. 5, 2007, EP 08102147.9 filed Feb. 29, 2008, EP 08102148.7 filed Feb. 29, 2008 and EP 08102149.5 filed Feb. 29, 2008, the entire content of each of which is expressly incorporated herein by reference thereto.

BACKGROUND

The present invention relates to a capsule for preparing a beverage or liquid food from a food substance which is brewed or extracted by using centrifuge forces exerted on a receptacle which contains the substance. The invention also relates to a system for carrying out the method.

It is known to prepare beverages wherein a mixture consisting of brewed coffee and coffee powder is separated with centrifugal forces. Such a mixture is obtained by bringing hot water and coffee powder together for a defined time. The water is then forced through a screen, on which screen powder material is present.

Existing systems consist of placing the coffee powder in a receptacle which is usually a non-removable part of a machine such as in EP 0367 600B1. Such devices have many disadvantages. Firstly, the coffee powder must be properly dosed manually in the receptacle. Secondly, the spinned coffee waste becomes dry and it must be removed by scraping the surface of the receptacle. As a result, the coffee preparation requires a lot of manual handling and is so very time consuming. Usually coffee freshness can also vary a lot and this can impact on the cup quality because coffee comes generally from bulk package or coffee is ground from beans in the receptacle itself.

Also, depending on the manual dosage of coffee and the brewing conditions (e.g., centrifugal speed, receptacle size) the cup quality can vary a lot.

Therefore, these systems have never reached an important commercial success.

In DE 102005007852, the machine comprises a removable holder into which an open cup-shaped part of the receptacle is placed; the other part or lid being attached to a driving axis of the machine. However, a disadvantage is the intensive manual handling. Another disadvantage is the difficulty to control quality of the coffee due to a lack of control for the dosing of the powder and a lack of control of the freshness of the coffee powder.

Other devices for brewing coffee by centrifuge forces are described in WO 2006/112691; FR2624364; EP0367600; GB2253336; FR2686007; EP0749713; DE4240429; EP0651963; FR2726988; DE4439252; EP0367600; FR2132310; FR2513106; FR2487661; DE3529053.

However, the effect of centrifugal forces to brew coffee or other food substances presents many advantages compared to normal "espresso" type brewing methods using high pressure pumps. In "espresso" types brewing methods, it is very difficult to master all the parameters which influence the quality of extraction of coffee. These parameters are typically the pressure, the flow rate which decreases with the pressure, the compaction of the coffee powder which also influences the flow characteristics and which depends on the coffee ground particle size, the temperature, the water flow distribution and so on.

Therefore, there is a need for proposing a new extraction process and a capsule adapted therefore for which the extraction parameters can be better and more independently controlled and therefore can be better mastered for controlling quality.

At the same time, there is a need for a method which is more convenient compared to the prior art centrifugal devices and which provides a better in-cup quality with a higher control of important quality parameters such as freshness and dosage in the receptacle. The present invention now satisfies these needs.

SUMMARY OF THE INVENTION

Therefore, the capsule of the invention is for preparing a beverage or liquid food from a food substance contained in the capsule by passing water through the substance using brewing centrifugal forces comprising:

an enclosure containing a predetermined dose of substance, means for connecting the capsule to external rotational driving means wherein said means are configured to offer a resistance to torque during rotation of the capsule for maintaining the capsule in a reference rotational position.

In an embodiment, the connecting means of the capsule preferably comprises a tubular portion protruding from the capsule.

In another embodiment, the connecting means comprises at least one recess portion.

In another embodiment, the surface of the capsule comprises a roughened portion.

The roughened portion thus creates a sufficient resistance to the driving surface of the device that enables to drive the capsule in rotation.

In yet another embodiment, the surface of the capsule comprises a toothed structure. In an aspect of the invention, the capsule comprises opening means for letting the brewed liquid leave the capsule wherein the opening means opens under the effect of the fluid being moved by the centrifugal forces when the capsule is driven in rotation.

For instance, the opening means forms at least one radial outlet for the brewed liquid.

Preferably, the capsule has a flared design and the at least one radial outlet is positioned or created at or close to the larger side of the flared design. This design and outlet arrangement promotes the flow of the centrifuged brewed liquid in the capsule, its collection and its removal from the capsule.

In a convenient embodiment, the outlet can be obtained by the centrifugal forces which exert a flexure on at least one deflectable portion of the capsule.

The capsule may comprise a cup-shaped body and a lid that closes the body.

For instance, the deflectable portion is an elastic lip acting in closure on a surface of the capsule. The deflectable lip is integral to at least one wall of the capsule. It can be moulded in plastic with a part of the capsule, i.e., a lid or body of the capsule. The lip can, for instance, be inserted in a peripheral cavity or groove of the capsule. The groove may be formed in the body or lid. The lip can be formed on the opposed part where the groove is formed, i.e., the lid or body of the capsule.

In another mode, the invention relates to a capsule for preparing a beverage or liquid food by passing water through a substance contained in the capsule by using brewing centrifugal forces comprising:
- a gastight enclosure containing a predetermined dose of substance,
- at least one outlet placed at the periphery of the enclosure for the brewed liquid to leave the capsule when centrifuge forces are exerted in the capsule.

In this mode, premade radial outlets for the brewed liquid are provided in the capsule. For instance, a series of slits are provided in the lid and/or body. When the capsule is driven in rotation, the brewed liquid can pass through the slits whereas the solid particles are retained in the capsule. An additional filtering layer can be used to filter the liquid depending on the size of the outlets.

Furthermore, the capsule can comprise an injection tubular portion for transporting water in the capsule. The tubular portion has a water inlet on a surface of the capsule and a water outlet communicating internally in the cavity of the capsule. Preferably, the capsule has flared sidewalls. Preferably, the water outlet is close to the bottom of the capsule so that water arrives inside the cavity containing the substance at the bottom side. The bottom refers to the more narrow side of the capsule by reference to the flared design.

The capsule can contain a dose of substance for preparing one or at most two servings of beverage. The capsule contains ground coffee powder, soluble coffee, or tea.

The invention also concerns a system for preparing a beverage or liquid food from a food substance contained in a filtering receptacle by passing water through the substance using centrifugal forces comprising:
- a device comprising:
  - water feed means for introducing water in the receptacle,
  - driving means for driving the receptacle in centrifugal rotation,
  - referencing means for positioning and referencing the receptacle in the device in operational relationship with the water feed means and the driving means.

According to an aspect of the invention, the receptacle is formed by a capsule which comprises means for connecting the capsule to the driving means.

The device also comprises complementary connecting means for engaging the connecting means of the capsule.

The term "sealed" capsule means that the capsule is made of materials having gas barrier properties and is sealed in a fluid tight manner so that ingress of air in the capsule is prevented. Furthermore, the capsule preferably contains an inert gas that improves the freshness of substance in the capsule. The capsule can also be wrapped with an outer protective membrane.

Preferably, the capsule contains a dose of substance for preparing one or two servings (e.g., cups) of beverage. Cups of beverage are usually sized between about 25 to 110 mL.

The dose of substance for a single cup of coffee may be, for instance, between 4 to 8 grams of roast and ground coffee.

It must be noted that surprising improved brewing results are obtained by this method which can lead to amounts of coffee solids in the cup which are higher than pressurized "espresso" type methods. Without being bound by theory, it is supposed that water flow is more uniformly distributed by centrifuge effect and it creates less or no preferential flow paths in the coffee bed as compared to traditional methods using positive pressure.

The food substance in the capsule can be ground coffee powder, soluble coffee, or tea.

The capsule is preferably driven in rotation at a centrifugal speed of at least 5000 rpm, more preferably higher than 7000 rpm. The centrifugal speed for ground coffee powder is comprised between 1000 and 16000 rpm. Surprisingly, at such high rotational speeds, improved coffee crema is obtained. Crema has a more creamy consistency like a real emulsion of oil and water compared to usual crema obtained by traditional methods which is more watery with larger bubble size.

Of course, the speed also depends on the nature of the food ingredient. For leaf tea, the centrifugal speed is preferably low to provide infusion rather than a pressure extraction. In particular, for leaf tea, the centrifugal speed is comprised between 10 and 1000 rpm, more preferably between 50 and 500 rpm.

The capsule can comprise a sealing lid. The sealing lid can comprise a flexible membrane. The membrane can comprise gas barrier and support layers made of polymers, aluminium and/or aluminium alloys.

The capsule can also comprise a cup-shaped body onto which the sealing lid is sealed. The cup-shaped body also comprises gas barrier materials. It can be in metal such as thin aluminium and/or plastic.

In another embodiment, the capsule is made of two sealed flexible foils. The foils can be symmetrically arranged forming two identical sides.

The method of the invention comprises an operation wherein hot water is introduced into the capsule at substantially no pressure. Water can be brought by a hot water feed mechanism using a principle of aspiration or vaporisation.

Alternatively, for a higher flow consistency, hot water can be introduced using a low pressure pump such as a peristaltic pump or a diaphragm pump and the like.

The method also encompasses an operation during which at least one radial outlet is made before or when water is introduced in the sealed capsule.

The outlets can be pierced on a lid of the capsule. Outlets can also be pierced on a sidewall of the capsule.

In one mode, a plurality of outlets is formed by piercing at a peripheral area of the capsule. This method has the advantage to require a simple capsule. The number of outlets can be chosen to control the flow rate of the beverage. Since the outlets are radially oriented in series, a high pressure layer or jets of the brewed liquid is formed that is expelled out of the capsule.

Preferably, in the method of the invention, the brewed liquid is also collected to form a homogeneous flow of the liquid food or beverage which can be directed to the cup.

In one aspect of the capsule of the system, the capsule comprises trunconical sidewalls which promote the drainage of the brewed liquid across the substance to the outlet(s) of the capsule.

In another possible aspect, the capsule has a rigid lid resiliably attached to the cup-shaped body. The lid can be plastic. The lid and body can be attached via a radial deflectable sealing means which opens by effect of the centrifugal effect to let the food lid pass. For example, the deflectable sealing means can comprise at least one peripheral plastic lip of the lid engaging in a seat of the cup-shaped body or vice versa.

BRIEF DESCRIPTIONS OF THE DRAWINGS

Additional features of the invention will appear in the detailed description of the figures which follows.

DETAILED DESCRIPTION OF THE INVENTION

Figure 1:
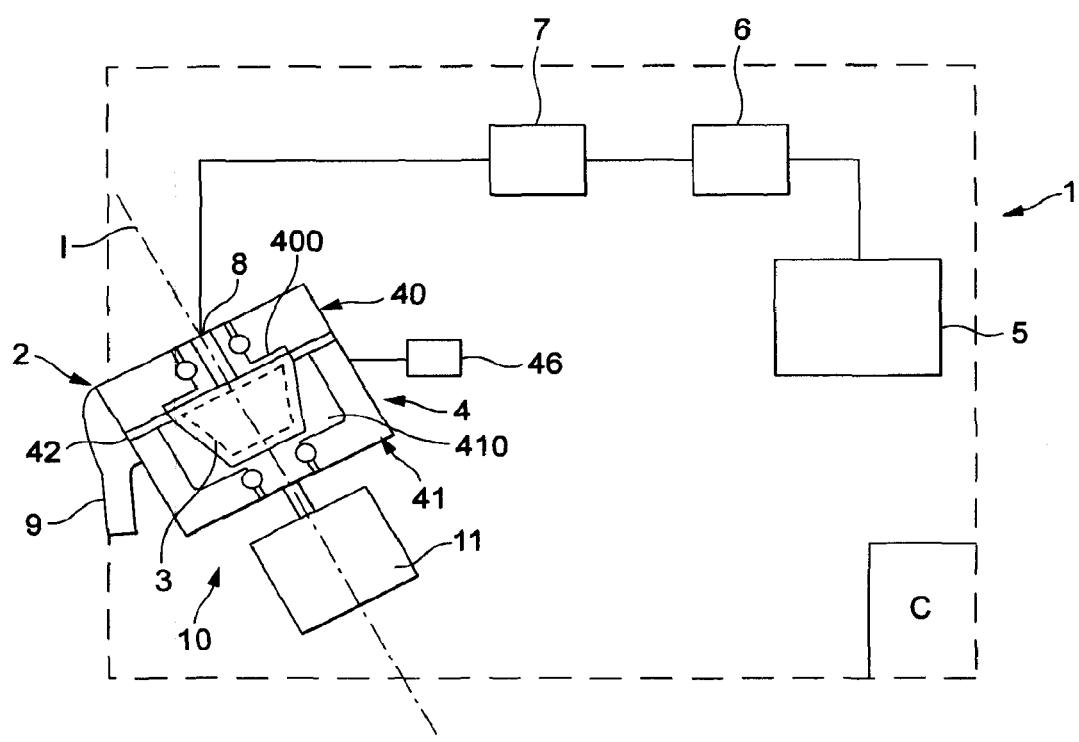
FIG. 1 is a schematic representation of system of the invention.

The system 1 of the invention is illustrated in FIG. 1 in the more general sense. The system comprises a device 2 and a capsule 3. The device has a brewing module 4 into which the capsule can be inserted for being brewed and is removed after use for being discarded (e.g., for waste or recycling). The module is in fluid communication with a water reservoir 5 containing fresh or, alternatively heated water. A fluid transport means such as a low pressure pump 6 can be provided in the water circuit to transport water from the reservoir to the module. A water heater 7 is further provided to heat water to the desired temperature. It can be noted that water could be heated in the reservoir itself and water could be transported from the reservoir by effect of vaporisation. Water can be fed into the module 4 at low or substantially no pressure. For example, a pressure between 0 and 2 bars above atmospheric pressure can be envisaged at the inlet 8 of the module.

The brewing module 4 can comprise referencing means 40, 41 for retaining the capsule in a predetermined position in the module. The capsule can be maintained in a slightly inclined position to promote the exit flow of the brewed liquid to a brewed liquid outlet 9. For instance, an angle of inclination relative to vertical can be between 2 and 65 degrees. The referencing means can comprise a capsule holder 410 and an injection lid 400. Both holder 410 and lid 400 are mounted to rotate along an axis of rotation I. The capsule holder comprises a cavity having the shape of the capsule to be received. The lid is designed to assemble against the capsule holder in a removable manner. A liquid passage 42 can be created in the module to enable liquid to be drained and collected from the capsule to the fixed outlet 9.

Driving means 10 are provided for driving the lid 400 and capsule holder 410 together in rotation and, by way of consequence, the capsule too. For this, the driving means includes an electrical motor 11 having a shaft connected to the capsule holder to force the capsule holder 41 in rotation. Since the lid 40 is attached to the capsule holder 41, the lid is also driven in rotation at the same speed as the capsule holder.

The surfaces of the collecting means of the device can be regulated in temperature so that the brewed liquid exiting the capsule is maintained at a proper temperature and does not cool down before reaching the cup. For this the lid assembly 40 and/or capsule holder assembly 41 can be associated to heating elements 46 for maintaining the capsule holder at a heated regulated temperature, such as with heating wires or thick films and the like.

Figure 2:
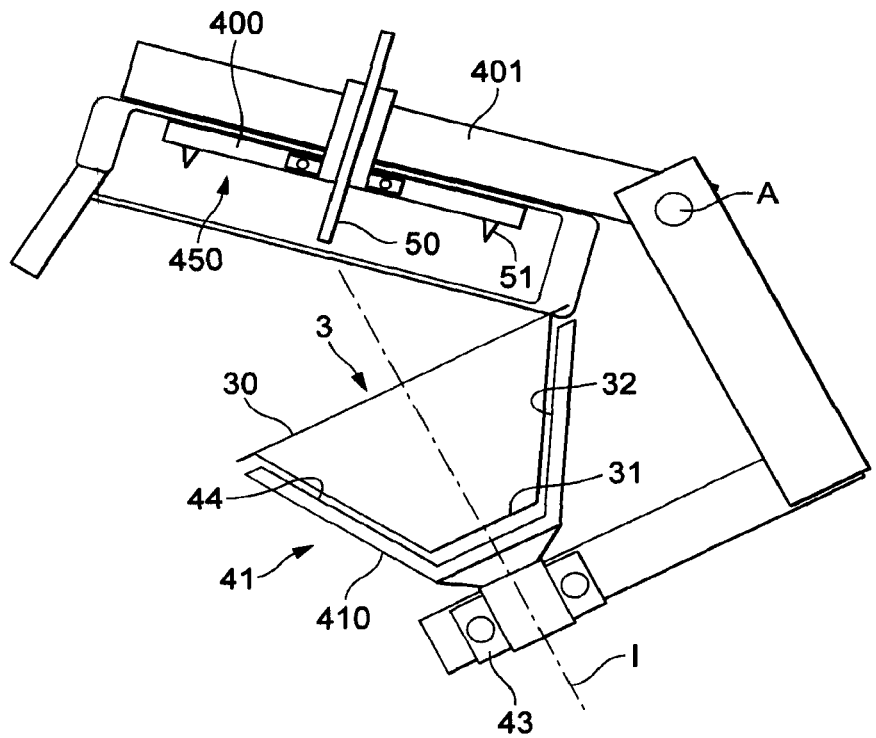
FIG. 2 is a schematic representation of a brewing module in open position of the system of the invention into which is inserted a capsule.
Figure 3:
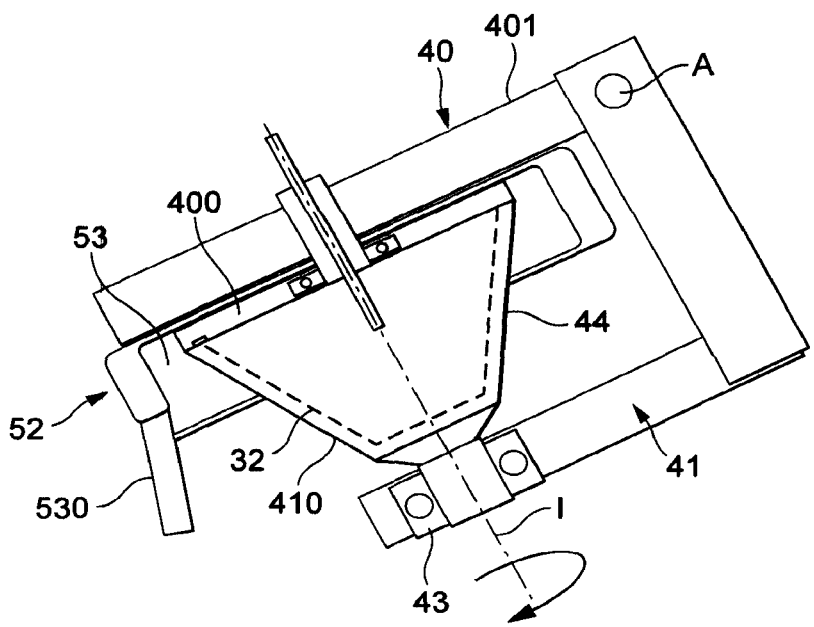
FIG. 3 is a schematic representation of a brewing module in closed position of the system of the invention which encloses a capsule.

FIGS. 2 and 3 show a detailed view of the principle of centrifugation of the capsule. The device comprises a capsule holder assembly 41 with a holder 410 having a trunconical housing 44 in which the capsule 3 is inserted. The holder is mounted along an axis of rotation I by a bearing 43. The injection lid assembly 40 is provided with an internal lid 400 which can be mounted on a fixed support part 401 of the lid assembly 40 in a pivotable manner along the axis I when the device is closed (FIG. 3).

The lid assembly and capsule holder assembly are associated along a transversal axis A between an open position as illustrated in FIG. 2 and a closed position of FIG. 3.

At the inside surface of the injection lid 40 is placed a piercing structure 450 which has the function of piercing the injection side 30 of the capsule. A water injector or lance 50 is provided which traverses the injection side 30 and which comprises an injection conduit for carrying water from the water circuit into the capsule. The water injector 50 is preferably located in the centre of the capsule. Water can thus be injected in the capsule at a location placed between the capsule lid 30 and the capsule bottom 31. The outlet of the water injector is placed closer to the bottom 31 than to the lid so that water can first wet the substance in the bottom area of the capsule. The lid further comprises outlet piercing elements 51 which are placed on the inside of the lid at a radial position. Preferably, a series of piercing elements 51 are placed uniformly along the periphery of the lid. Further the capsule comprises an inclined sidewall 32 which widens from the bottom 31 to the top 30 in direction of the radial openings or outlets pierced by the piercing elements 51. The lid is further provided with a collecting assembly 52 comprising an inside chamber 53 surrounding the capsule's radial openings and a nozzle 530 forming a tube for directing the beverage of liquid food to the recipient or cup. It can be noted that there is no need for a hermetical arrangement between the upper and lower parts 40, 41 of the device. Since water is pushed by the effect of gravity, water flows radially and uniformly to the sidewall 32 of the capsule to traverse the substance toward the periphery of the capsule and upwards to the radial opening along the sidewall 32. The brewed liquid so impacts the outward surface of the collecting assembly 52 and is so collected and pushed still by effect of gravity to the collecting nozzle 530. The advantage of the system is that there is a low axial pressure therefore there is less need for high mechanical closure forces. The technology is relatively simple since a motor working at low current is sufficient to provide the necessary momentum to carry out the brewing process. Furthermore, several types of heaters can be used such as thermos or gas.

Figure 4:
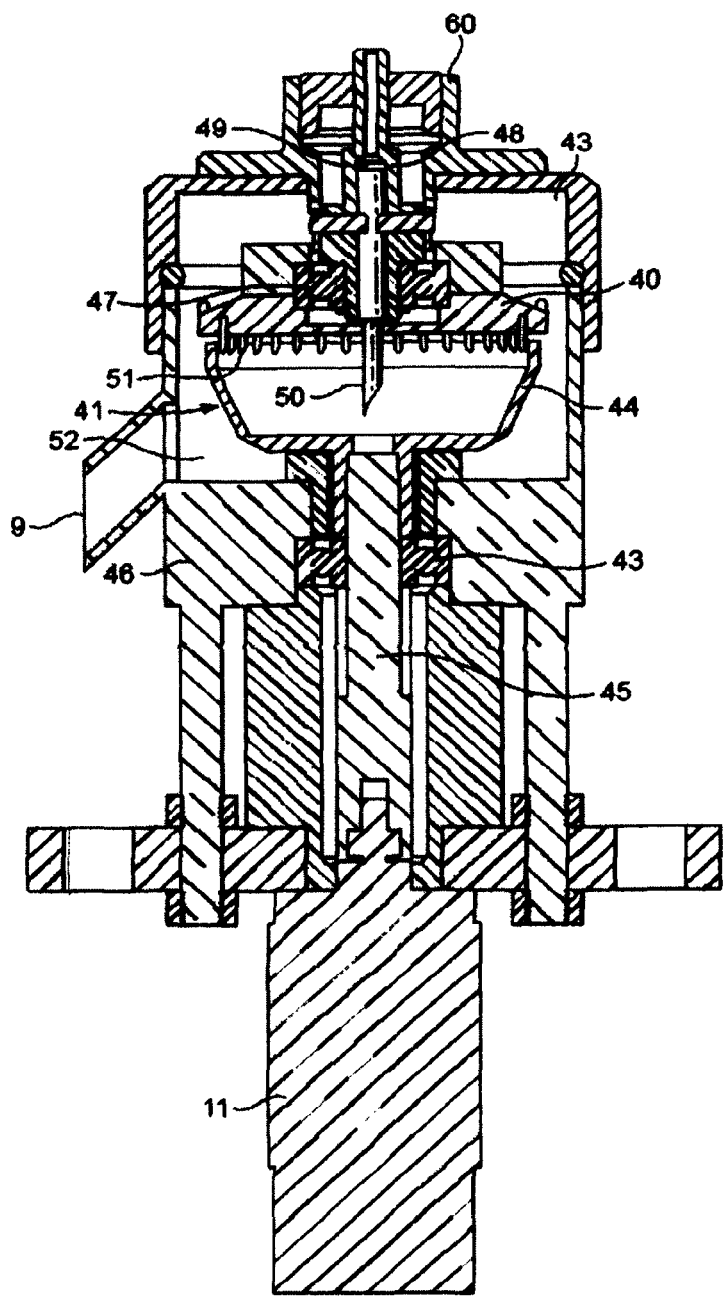
FIG. 4 is a detailed cross sectional view of the system of the invention in a first embodiment.

FIG. 4 shows a more sophisticated system of the invention. The system comprises a capsule holder 41 which is associated to a central rotating rod 45 mounted along a lower bearing 43, which is supported on a support 46. On the lower end of the rod 45 is associated an electric rotary motor 11. At the opposite side, a lid 40 is associated to an upper bearing 47, along a hollow rotating rod 48 for the entry of water in the capsule through a conduit 49 traversing the rotating rod 48. The rotating rod 45 is mounted on an upper frame 60 of the system. A series of needles 51 is also positioned on the side of the lid 40 to form small perforations at the periphery of the upper side of the capsule. The number of needles can be set between 5 and 50, preferably between 10 and 30. The higher the number of needles, the more uniform the distribution of liquid can be. When the needles 51 are engaged in the capsule, the lid is driven in rotation by the capsule itself which is also driven by the rotor 45.

The rotational speed can be set between about 1000 and 20000 rpm. For this a control unit C (FIG. 1) is provided in the device for adjusting the rotational speed as a function of the beverage to be brewed. The higher the rotational speed, the more radial pressure is exerted in the capsule by the liquid and the more the substance is compacted on the sidewall of the capsule. Also, the higher the speed, the lower the residence time of the liquid in the capsule.

For example, for tea, the rotational speed can be minimal to enable a slow transfer of water through the mass of tea leaves and to provide an infusion of the tea.

For ground coffee, the speed should be high, i.e., higher than 5000 rpm, preferably within a range of about 8000-16000 rpm, in order to perform optimal extraction conditions in term of coffee solid contents in the cup and quality of the crema. It has been surprisingly found that crema obtained is much creamier than by using the standard espresso brewing methods.

Therefore, depending on the types of beverage to be brewed, the control unit can be programmed to adjust the optimal centrifugal conditions. For instance, the control unit may be associated to a capsule recognition system enabling to recognize the types of capsules, i.e., espresso, lungo, cappuccino, latte, tea, etc., and to adjust the speed and/or other brewing parameters (e.g., water temperature) according the capsule which is inserted in the device.

The brewed liquid is collected in a collecting chamber 52 of the support 46 and drained through a collecting tube 9.

Figure 5:
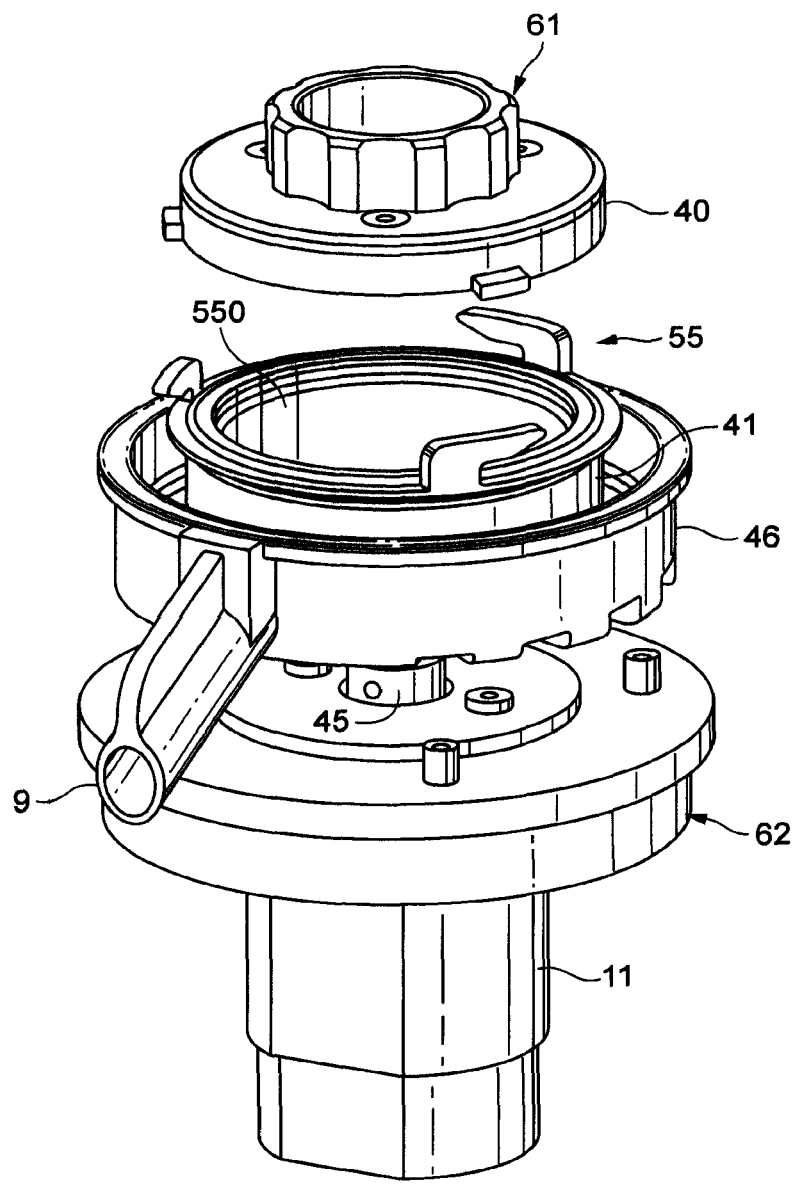
FIG. 5 is an exploded view of another embodiment of the device of the invention.

FIG. 5 illustrates another embodiment in which the injection lid 40 is connected to the capsule holder 41 by a bayonet type connection 55 or any equivalent connection means. In this embodiment, only one lower bearing (not shown) is necessary. The capsule holder 41 and the lid 40 are thus connected together and both turn along a lower rotational axle 45. The capsule holder comprises a cavity 550 for receiving the capsule. The injection lid is then connected to the capsule holder along a helicoidal tightening momentum by the bayonet means 55. For example, the bayonet means can comprise a series of radially extending protrusions on the lid which fits into a series of hooks carried on the edge of the capsule holder. Tightening may be performed by a gripping portion 61 placed on the upper side of the lid. However, the assembly must let liquid pass between the lid and the holder. A sealing joint between the lid and holder is therefore not desirable. A predefined clearance may also be ensured for controlling the exit flow of the brewed liquid by foreseeing slots or grooves of predetermined dimensions at the interface between the lid and holder.

A collecting assembly 46 having the shape of a cup larger than the capsule holder is also placed about the brewing enclosure 40, 41 for collecting the brewed liquid. The collecting assembly takes support on a base 62 of the device onto which is connected the motor 11. A liquid duct 9 is provided on a side of the cup which is slightly inclined downwards for the liquid to flow in the direction of a receptacle (e.g., a beverage cup).

Figure 6:
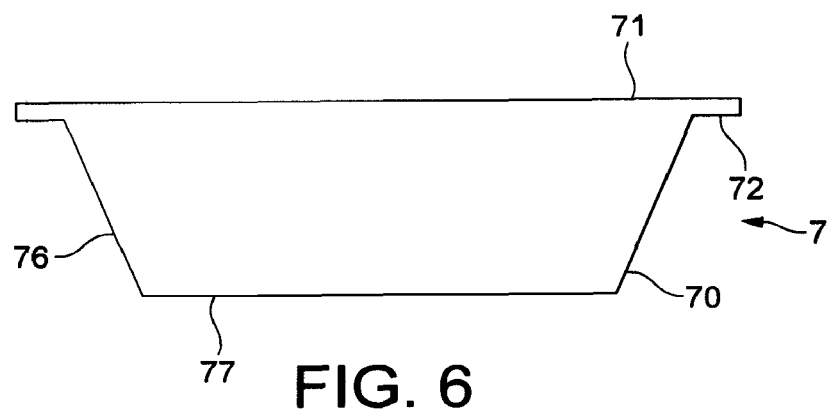
FIG. 6 shows a sealed capsule which can be used in the device of the invention according to FIG. 4 or 5.
Figure 7:
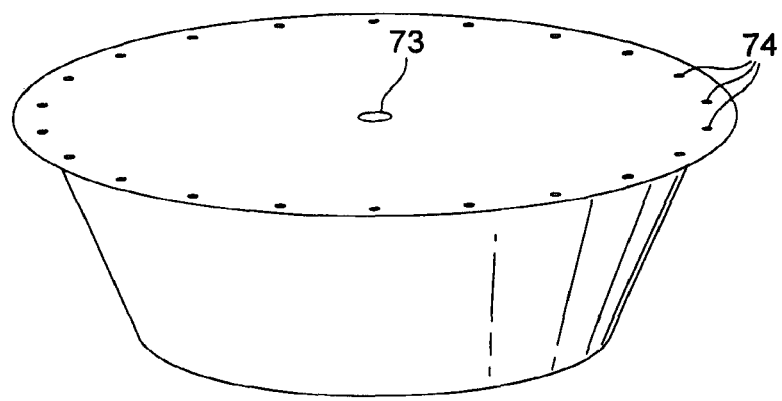
FIG. 7 shows a capsule after its use in the system of the invention.

FIGS. 6 and 7 illustrate a capsule that can suit the device according to the different embodiments of FIGS. 2 to 5. In FIG. 6, the capsule 7 comprises a cup-shaped body 70 with upwardly oriented sidewall 76 and a bottom wall 77. The sidewall forms a portion of cone which promotes the collection of the brewed liquid internally. The body terminates by an upper edge 72 raising outwards onto which is sealed a lid 71. The lid may be a flexible pierceable membrane of several microns in aluminium and/or plastic. The lid can be welded on the upper edges 72 of the body. It can be pointed out that the membrane and body preferably comprise gas barrier layers such as aluminium and/or EVOH.

The capsule contains a substance chosen among the list consisting of ground coffee, soluble coffee, tea, a whitener such as dairy or non-dairy ingredient(s), herbal tea, nutritional substance, culinary ingredients and a mixture thereof.

FIG. 7 illustrates the capsule after brewing of the substance in the device. A central water inlet 73 is pierced through the lid for passage of the water injector 50. On the side of the lid are pierced outlets 74 communicating with the inside cavity for the brewed liquid to exit the capsule.

Figure 8:
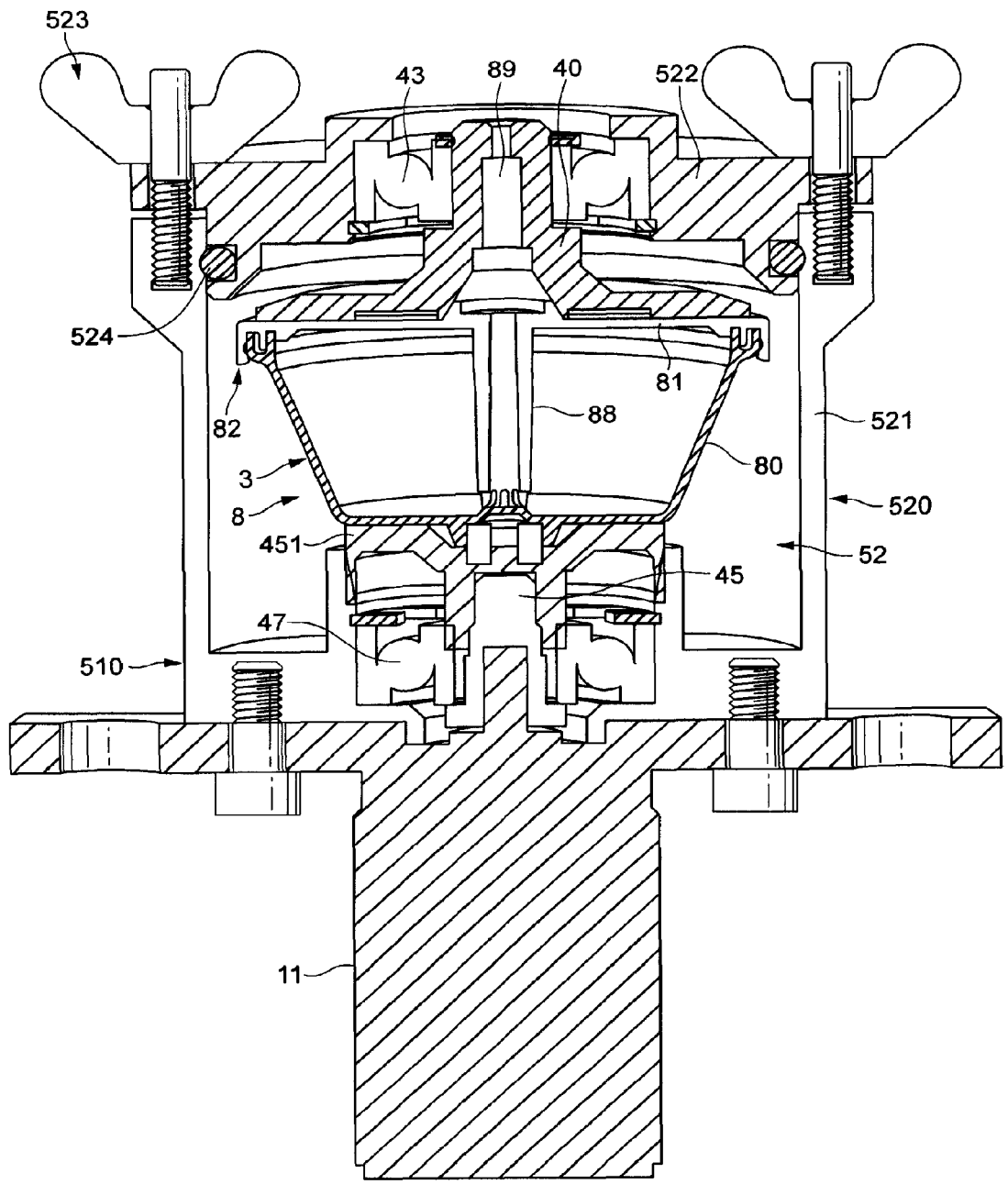
FIG. 8 is a detailed cross sectional view of the system of the invention in a second embodiment.
Figure 9:
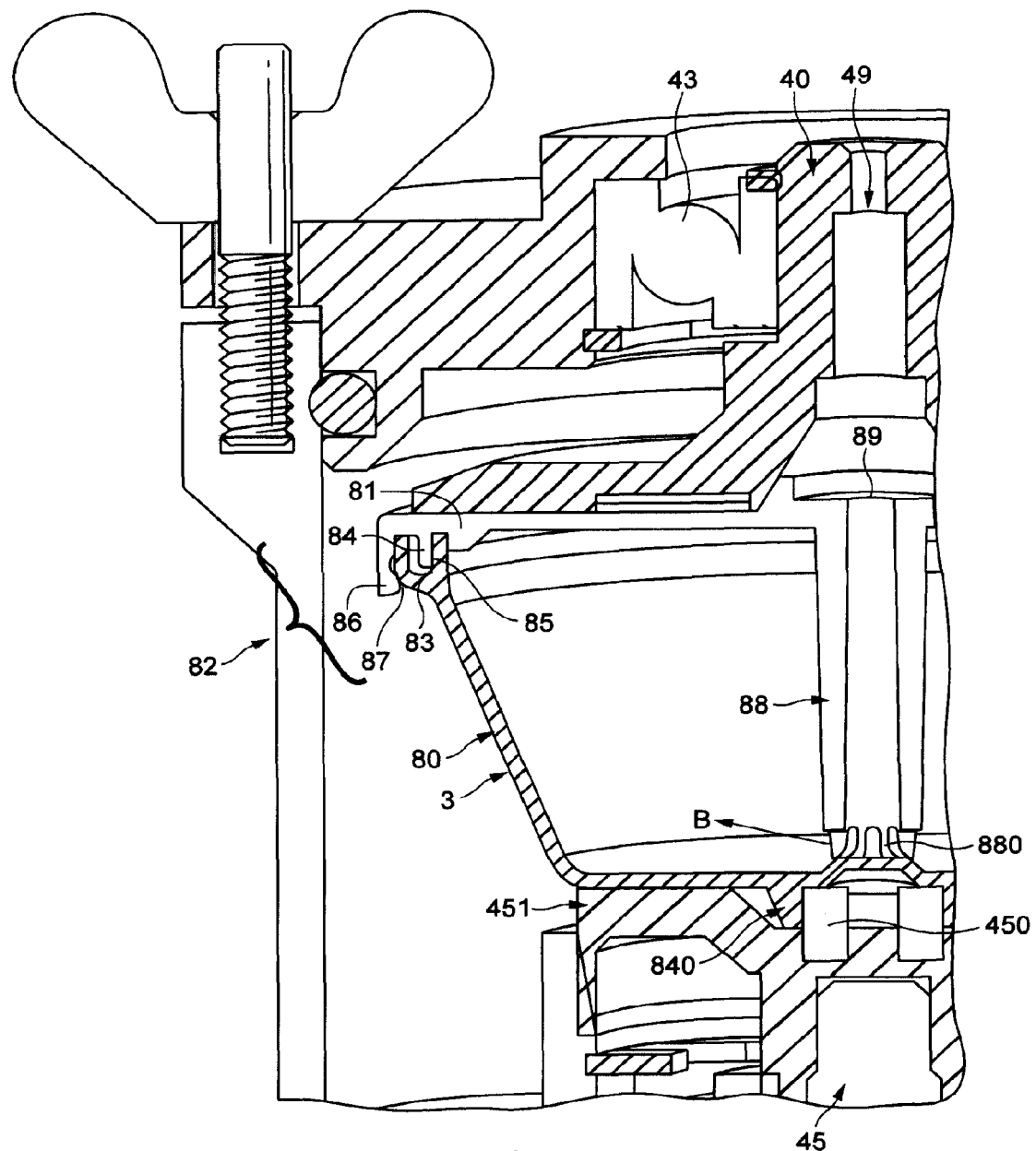
FIG. 9 shows a detail of the system of FIG. 8.
Figure 10:
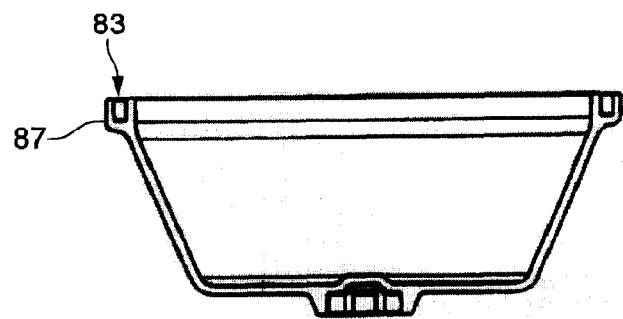
FIG. 10 shows a cross sectional view of the cup-shaped body of the capsule in the system of FIGS. 7 and 8.
Figure 11:
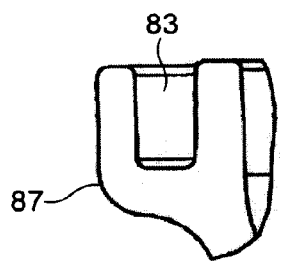
FIG. 11 shows a detail view of the clipping edge of the sup-shaped body.
Figure 14:
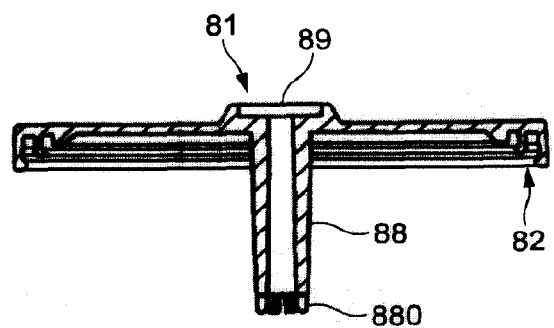
FIG. 14 shows a cross sectional view of the lid of the capsule in the system of FIGS. 8 and 9.
Figure 15:
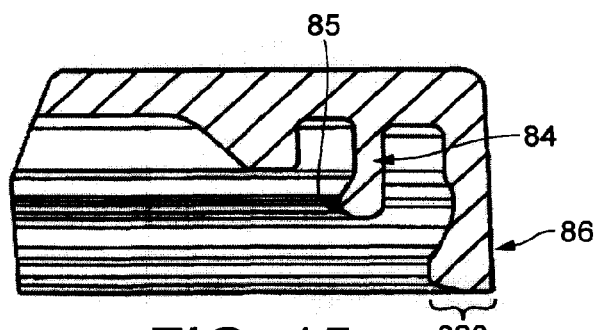
FIG. 15 shows a detailed view of the deflectable sealing means of the lid of FIG. 14.
Figure 16:
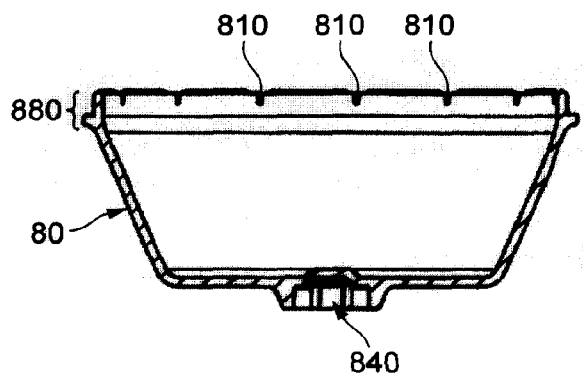
FIG. 16 shows a cross sectional view of the cup-shaped body of the capsule according to another embodiment.

Another embodiment of the present invention is illustrated in relation to FIGS. 8 and 9. In this embodiment, a capsule 8 comprising its own inflow and outflow means. More specifically, the capsule comprises a cup-shaped body 80 made of plastic onto which is secured a plastic lid 81. The lid can be tightly clipped onto the body along its edge by sealing means 82 illustrated in more details in FIGS. 9, 14 and 15. The sealing means act as a valve. More particularly, the edge of the body comprises a peripheral groove 83 formed of two small parallel and circular portions of wall rising upwardly. For this, the lid has a peripheral portion of wall forming a lip 84 that inserts itself in the groove 83. The lip 84 can end by a thicker rounded shape 85 to create a closing pressure on the surface of the groove 83 in the housing, which pressure must be overcome to let the liquid pass through the cavity or annular groove 83. The sealing lip 84 is designed in such a way that it can open a radial passage in the groove for the brewed liquid under the effect of liquid opening them when the liquid is centrifuged.

At the periphery of the lid is provided a secondary closure lip 86 that fits on the outer edge 87 of the body. This second lip 86 is designed to provide locking of the lid on the body of the capsule. For this, the lip 86 comprises an enlarged section 860 which presses on the outer surface 87 of the edge of the body.

The secondary lip 86 creates a clipping function for connection of the lid onto the body and eventually it also forms a second hurdle to be overcome for the brewed liquid to pass. This tortuous path as formed by the series of lips 84, 86 and the groove 83 generates high shear forces on the brewed liquid. The secondary lip can also be traversed by radial slits for promoting the flow of the brewed liquid (not shown). For coffee, this may result in generating a thicker and more stable crema. It can be noted that this lip could be omitted in the context of a simpler structure of the capsule.

In the centre of the capsule's lid is provided a water flow distribution member formed of a tubular portion 88 extending from the lid. This tubular portion 88 has a water inlet 89 which can be fitted to the water injection conduit 49 of the injection lid 40 of the system. The tubular portion 88 ends by flow distributing means 880 formed of several slots directed outwards in the cavity of the capsule. Several slots are distributed at the free end of the tubular portion 88. The tubular support may abut against the bottom surface of the body for demarcating the slots and for directing water in many radial directions. For instance, the number of slots may be comprised between 2 and 10. Therefore, water coming from the top will traverse the tube 88 and will exit the tube at the slots in the radial direction of the arrow B identified on FIG. 9. It can be noticed that water is so injected preferably close to the bottom of the capsule; therefore ensuring a proper wetting of the substance, e.g., coffee powder, and in the direction from the bottom to the top (i.e., between the lid and body) where the brewed liquid leaves the capsule.

The capsule 8 of FIGS. 8 to 15 according to this embodiment can further include means 840 for gripping the bottom of the capsule and so enabling the capsule to be properly driven in rotational motion by the device. For this, the means 840 comprises a small tubular portion protruding in the bottom of the capsule and into which can be inserted a complementary tubular portion 450 of the rotational driving means of the device.

Figure 12:
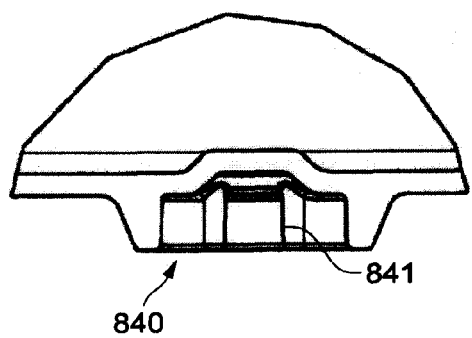
FIG. 12 shows a cross sectional view of a detail, i.e., the engaging connection, of the cup-shaped body of FIG. 10.
Figure 13:
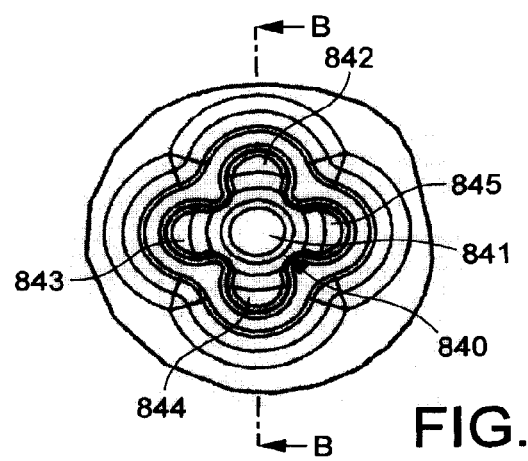
FIG. 13 shows a plane view of the detail of FIG. 12.

The driving means of the device further comprise a drive shaft 45 associated to a support 451 for holding the bottom of the capsule. Of course, the shape of the gripping means can take many other variations without departing from the scope of the present invention. FIGS. 12 and 13 show a gripping structure 840 having a central recess 841 and four arched recesses 842, 843, 844, 845 extending from the central recess 841. This gripping structure forms a lock into which is fitted a complementary engaging structure 450, i.e., a key, of the capsule holder 451. The complementary shapes of the capsule and capsule holder enable to fulfil both the gearing function for driving the capsule at high speeds in rotation and a safety function for ensuring that only capsules adapted to the system can be used and brewed successfully.

In this embodiment for FIGS. 8 and 9, the device itself comprises, as in the preceding modes, upper and lower bearings 43, 47 for enabling the injection lid and support of capsule 451 to rotate in conjunction with the capsule 3. Surrounding the capsule is a collecting assembly 52 with a cup 520 formed of a side and bottom walls 521 and an upper closing cover 522. The cover also serves for receiving the upper bearing 43 while the lower cup 520 has a central recess for receiving the lower bearing 47. The cup 520 and the cover 522 can be assembled in fluid tight manner to avoid uncontrolled projection of brewed liquid. Therefore connection means 523 can be provided and a fluid tight sealing element, such as an O-ring 524, can also serve to ensure tightness between the two parts. Also a beverage outlet tube (not shown) can be provided to drain the beverage outside of the collecting assembly.

As also apparent in FIG. 8, the driving means of the device comprise a lower electrical motor 11 which is coupled to a driving shaft or drive connector 45 which is itself connected to the capsule holder 451. Note that the capsule holder may be a simple plate support or disc 451 or a support shaped as a cup.

The brewing operation of the system of FIGS. 8 and 9 can be shortly explained as follows:

A capsule 3 as described contains a dose of substance is provided. The capsule can be filled with roast and ground coffee. The capsule is inserted in the cup 520 when the cover is removed and placed on the capsule holder 451 with the engaging structure of the engaging structure 450 fitting the recess portion 840 of bottom of the capsule. By the approach and connection of the cover 522 to the cup 520, The injection lid 40 is then connected or associated to the capsule's lid 81 with the water conduit 89 coming in communication with the water injection tube 88 of the capsule. When the device is in the closed position of FIG. 8, water can be injected at low pressure or just poured into the conduit through the tubular portion 88. Preferably, some water is poured to start wetting the substance in the capsule before the capsule is driven in rotation by the rotational driving means of the device. Then, the control unit starts the motor and the capsule is so driven in rotation at high speed to perform the centrifugal brewing operation. Under the effect of centrifugal forces, the powder substance tends to compact itself radially whereas water is forced to flow through the substance. This results in the substance being both compacted and intimately wetted by water. Due to high speed rotational movement, the centrifugal forces exert themselves uniformly on the mass of substance. Consequently, the water distribution is also more uniform compared to usual methods using a pressure pump to exert pressure on and through the bed of substance. As a result, there is less risk of preferential flow path through the substance which could lead to areas which are not properly wetted and so not properly extracted. With ground coffee powder, the liquid that reaches the internal sidewall of the capsule is so a liquid coffee extract. This liquid extract is then forced to flow upwards along the side of the capsule up to the sealing means 82. The sealing means 82 are thus submitted to an opening force by the liquid under the centrifuge effect. This results in the lip that tends to bend outwardly to create a passage between the surface 85 and the inner surface of the groove. Similarly, the second lip is also forced to bend or alternatively may allow a certain leakage, for example, with premade slits for letting the liquid escape the capsule. The liquid can thus flow through the small peripheral groove 83 and can exit out of the capsule. The brewed liquid can be so collected by the collector 52 and be guided outside of the device into the recipient.

Figure 17:
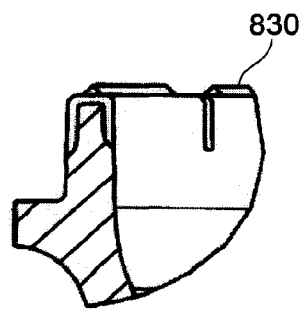
FIG. 17 shows a cross sectional view of a detail of the body of FIG. 16.
Figure 18:
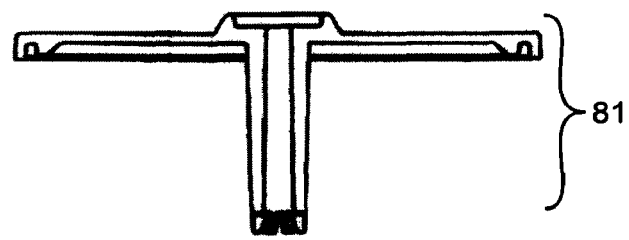
FIG. 18 shows a cross sectional view of the lid of the capsule that connects to the capsule's body of the embodiment of FIGS. 16 and 17.
Figure 19:
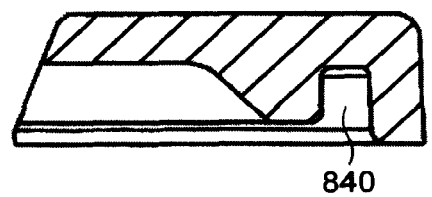
FIG. 19 shows a detail of the lid of FIG. 18.

FIGS. 16 to 19 illustrate another embodiment of the capsule according to the invention. This capsule has a cup-shaped body 80 comprising the same gripping means 840 at its outer surface for enabling the capsule to be driven in rotation in the device. The capsule also comprises a lid 81 shown in FIGS. 18 and 19. Contrary to the capsule of the preceding mode, the lid 80 and body 81 are attached by permanent connecting means such as ultrasonic welding. The brewed liquid that is centrifuged is allowed to pass through a series of slits 810 provided on the upwardly protruding edge 880 of the body. The slits are sized so to act as a filter for retaining the solid particles such as the ground coffee particles but let the liquid leave the capsule. The lid is connected with the edge 880 fitting into a radial groove 840 of the lid 81 (FIG. 19). FIG. 17 also shows small indents 830 serving as energy directors that can melt during the ultrasonic welding. In the present mode, the capsule does not comprise a deflecting sealing lip but it simply has slits 810 for enabling the brewed liquid to traverse the capsule. The capsule of this mode can be used in a device as illustrated in FIGS. 8 and 9.

Figure 20:
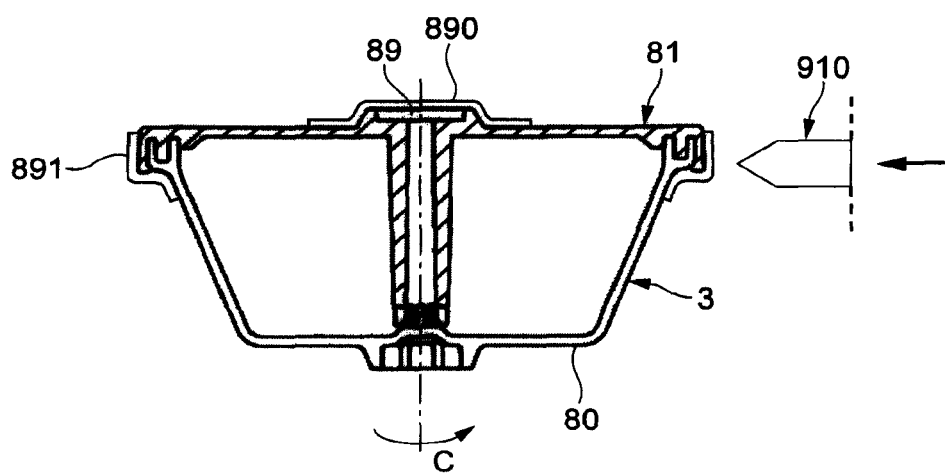
FIG. 20 shows a sealed capsule and an operational mode for removing the seal of the capsule.

In FIG. 20, a sealed capsule of the invention is shown. The capsule is formed, as described in the preceding modes, of a cup-shaped body 80 onto which is assembled a lid 81. The water inlet 89 of the lid is covered by a sealing membrane 890. The radial outlet area placed between the lid and body is also covered by a sealing membrane 891. Note that the same sealing membrane could cover both the water inlet 89 and the outlet area for the brewed liquid. The sealing membrane 891 can be a tamper evidence element such as a ribbon of an adhesive membrane sealed along the line between the lid and body. The ribbon can be cut by a cutting tool 910 in the machine, such as a blade or an equivalent means. As the capsule is driven in rotation (as shown by arrow C), the cutting tool is approached in contact with the ribbon which is thus automatically cut. The capsule is so no longer impervious and liquid can escape the capsule through the radial edge of the capsule as previously explained. One can note that the sealing membrane(s) can also be made of a peelable adhesive material so that the user himself can remove it (them).

Figure 21:
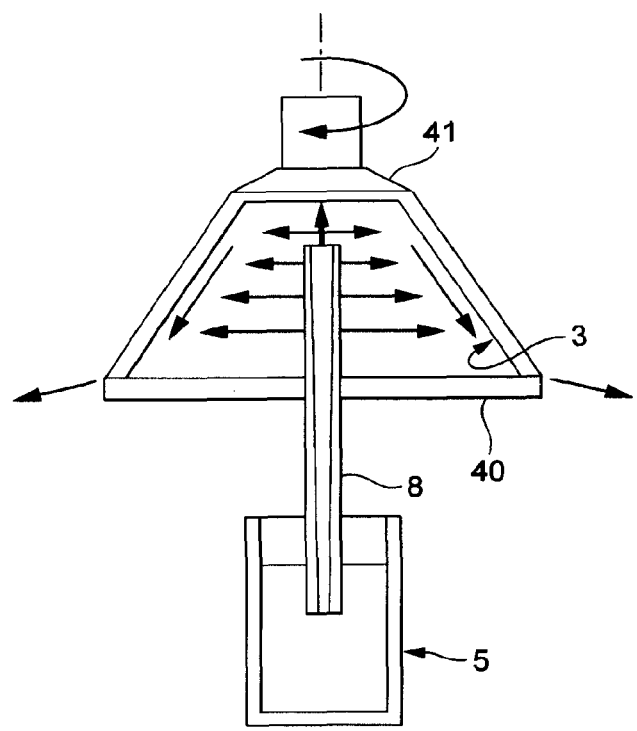
FIG. 21 shows a schematic view of the system of the invention according to another possible embodiment.

According to FIG. 21, the system may also foresee an injection of water by aspiration under the effect of the rotational momentum. For this, a capsule is housed in the referencing means 40, 41. An injection tube 8 connects a water reservoir to the inside of the capsule. The device is so oriented that the reservoir is below the capsule and water is transported by the vacuum that is produced in the centre of the capsule. The injection tube also engages into the capsule up to a region preferably closer to the more narrow side or bottom so that water can wet the whole mass of substance, e.g., ground coffee powder.

Figure 22:
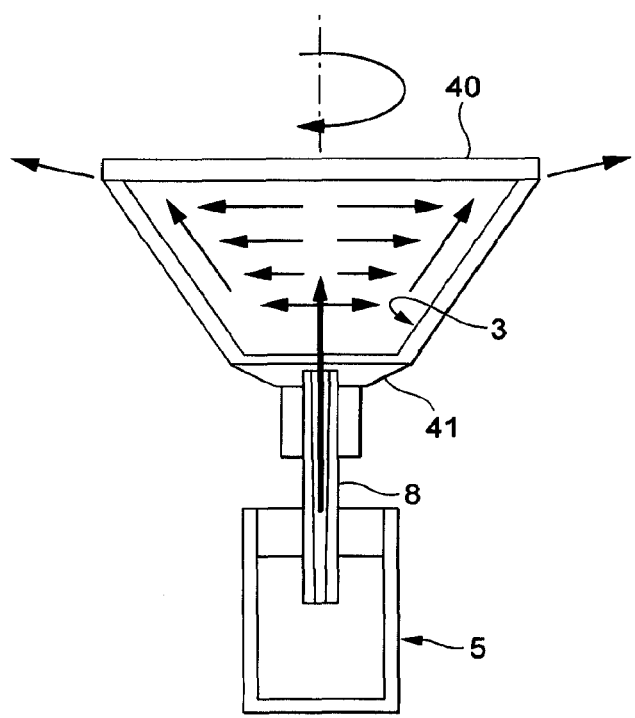
FIG. 22 shows a schematic view of the system according to still another embodiment.

One can note that the capsule can be positioned with its sidewall widening downwardly. In FIG. 22, the system is similar but the orientation of the capsule is simply inverted and it widens upwardly.

In the two embodiments of FIGS. 21 and 22, water is preferably injected near the more narrow side of the capsule, i.e., opposite the widening side, in order for the liquid to flow through the substance in the direction of the wider side of the capsule and to then exit the capsule.

Figure 23:
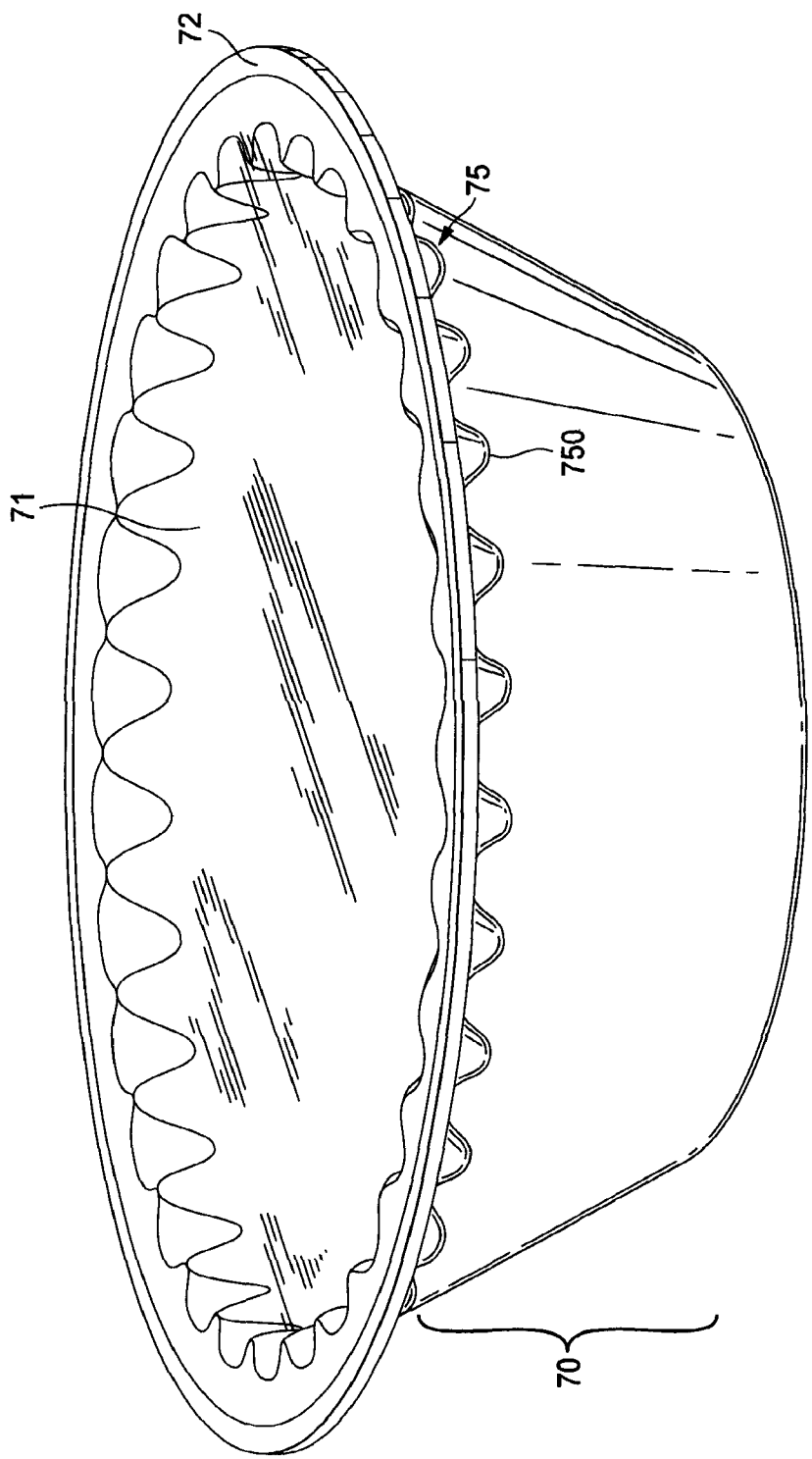
FIG. 23 shows a schematic view of the system according to still another embodiment.

FIG. 23 illustrates another capsule of the invention. The capsule comprises means for connecting it to the external rotational driving means of the device. For this, capsule has a toothed structure 75 on at least one of its outer surface. The capsule has a body 70 comprising an upper edge 72 which can be closed by an upper membrane 71. The toothed structure comprises a series of teeth which is positioned below the edge or rim 72 of the body of the capsule. The teeth are placed along the whole periphery of the body of the capsule. The body of the capsule can be made of plastic and/or aluminium or aluminium alloy. For example, it can be moulded by injection of plastic or deep drawn in aluminium. For example, the shape of the teeth could be slightly triangular, oval, rectangular or pyramidal. It should be noticed that the teeth could be replaced by other equivalent structures such as series of elements in relief and/or hollow. For example, slits, pins or small needles can be envisaged.

Figure 24:
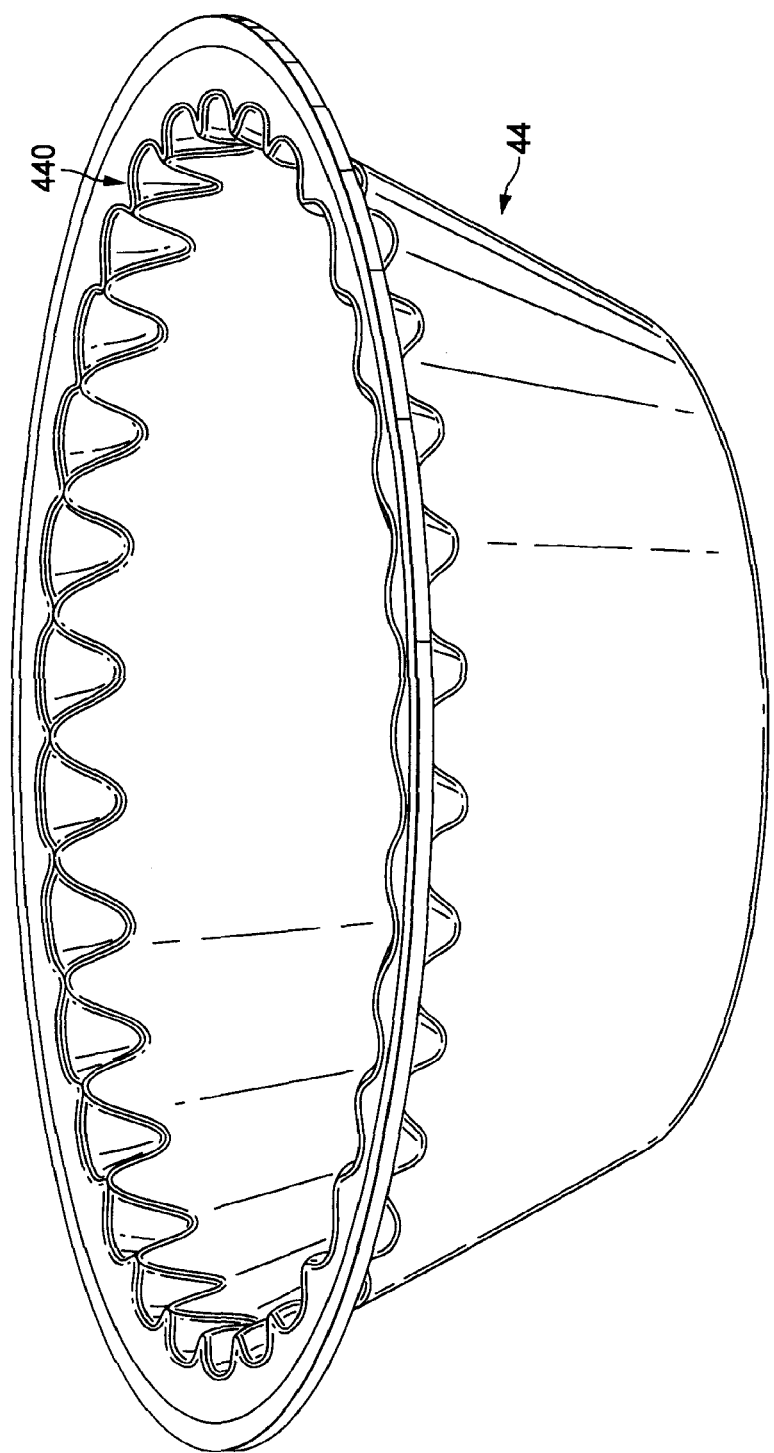
FIG. 24 shows a view of a capsule according to another mode of the invention.

The device itself that receives the capsule of FIG. 23 comprises a toothed surface of complementary shape. FIG. 24 shows a capsule holder 44 adapted to receive the capsule of FIG. 23. The capsule holder has a cavity into which are provided hollow teeth 440. The hollow teeth are arranged to fit the teeth 750 on the outer surface of the capsule.

It should be noted that the connecting or engaging structure of FIG. 23 can replace the structure of the capsule of FIGS. 8 and 9 or reciprocally.

Figure 25:
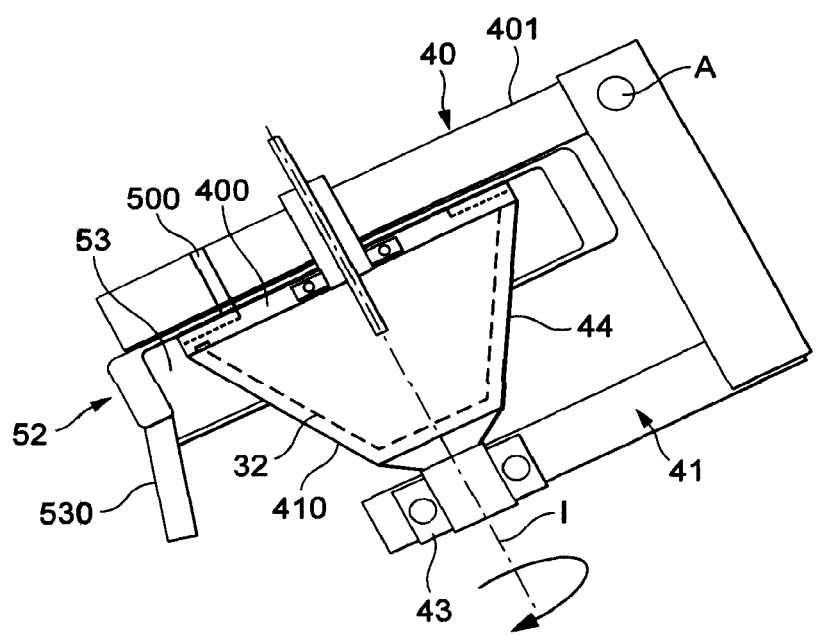
FIG. 25 shows a schematic representation of a brewing module in closed position of the system of the invention according to yet another embodiment of the invention.

In FIG. 25, is illustrated another embodiment of the brewing system of the invention. The difference is here that a water by-pass conduit 500 is provided in addition to the main water conduit 50 for adding a volume of water in the collecting assembly 52. A volume of water may be added before, during or after the centrifugal brewing operation in the capsule. The by-pass conduit ends on the upper surface of the rotating lid 400. The upper surface of the lid 400 may comprise a water distribution structure such as radial grooves or recesses to promote the flow of water toward the surface of the collecting assembly. The control unit may control the delivery of the added volume of water so that the volume is added at the same time as the coffee extract is delivered by centrifugation so that the foam that is created on the top of the beverage is not destroyed.

The system and method of the invention provide remarkable brewing results with solid contents which are higher than usual methods and devices. The results are very reproducible from capsule to capsule. Surprisingly, crema is also remarkably improved with a creamier, more stable and thicker texture.

Of course, the invention may encompass many variants which are included in the scope of the patent claims that follow.

What is claimed is:

1. A capsule for preparing a beverage or liquid food in a centrifugal brewing device from a food substance contained in the capsule by passing water through the substance using centrifugal brewing forces, the capsule comprising:
   an enclosure containing a predetermined dose of substance, the enclosure comprising a body for holding the food substance, the body having an upper rim, and a lid or membrane for closing the body at the upper rim, and
   means for engaging the capsule to external rotational driving means of a centrifugal brewing device, the engaging means comprising a gripping structure of a toothed structure or a series of protrusions or recessed elements on an outer surface of the enclosure, with the gripping structure having a shape that is complementary to an engaging structure of the driving means so that the capsule gripping structure locks into the engaging structure of the driving means to fulfil both a gearing function for driving the capsule at high speeds in rotation and a safety function for ensuring that only capsules with the gripping structure can be used and brewed successfully in the centrifugal brewing device, wherein the engaging means also offers resistance to torque during rotation of the capsule for maintaining the capsule in a reference rotational position.

2. The capsule of claim 1, wherein the gripping structure is a toothed structure associated with the capsule.

3. The capsule of claim 1, which further comprises radial opening means for allowing the beverage or liquid food to leave the capsule, with the opening means forming or creating at least one radial outlet by movement of the beverage or liquid food due to centrifugal forces when the capsule is driven in rotation.

4. The capsule of claim 2, wherein the capsule has a flared design and a series of spaced radial outlets positioned or created at or close to the larger side of the flared design.

5. The capsule of claim 2, wherein the opening means opens for creating the at least one outlet by movement of the beverage or liquid food due to centrifugal forces when the capsule is driven in rotation which forces exert a flexure on at least one deflectable portion of the capsule, with the deflectable portion being an elastic lip acting in closure on a surface of the capsule or inserted in a peripheral cavity of the capsule.

6. The capsule of claim 1, which further comprises an injection tubular portion having a water inlet on a surface of the capsule and a water outlet communicating internally in the capsule, wherein the water outlet is close to or in contact with the bottom of the capsule.

7. The capsule of claim 1, the capsule contains a dose of substance for preparing one or two servings of beverage and the substance is ground coffee powder, soluble coffee, or tea.

8. The capsule of claim 1 wherein the lid or membrane includes opening means which opens due to pressure experienced when the liquid is centrifuged to create a passage that allows the beverage or liquid food pass to leave the capsule.

9. The capsule of claim 8, wherein the opening means comprises a resilient valve.

10. The capsule of claim 8, wherein the opening means comprises at least one radial deflectable lip integral to a wall of the capsule.

11. The capsule of claim 10, wherein the deflectable lip is part of the lid or body of the capsule.

12. The capsule of claim 11, wherein the deflectable lip is present in a peripheral groove of the lid or body.

13. The capsule of claim 1, wherein the tooth structure comprises a series of teeth positioned below the rim of the body of the capsule.

14. A capsule for preparing a beverage or liquid food by passing water through a substance contained in the capsule by using brewing centrifugal forces comprising:
an enclosure comprising a cup-shaped body having a sidewall, a bottom wall and a lid sealed to the sidewall, the enclosure containing a predetermined dose of substance, and
a series of slits located at the periphery of the sealed lid of the enclosure that allows the beverage or liquid food to leave the capsule when centrifugal forces are exerted in the capsule wherein the outlet(s) retain solid particles in the capsule
wherein the enclosure includes a sealing membrane covering the series of slits to make the capsule gas-tight before use.

15. The capsule of claim 14, wherein the capsule has a flared cup-shaped body and comprises a lid connected to the flared cup-shaped body, with the at least one outlet placed at or close to the larger side of the flared cup-shaped body of the capsule.

16. A system for preparing a beverage or liquid food from a food substance contained in a capsule by passing water through the substance in the capsule, the system comprising:
a device comprising:
water feed means for introducing water into the capsule, and
means for centrifugally rotating the capsule to force the water to flow through the substance in the capsule in a centrifugal flow path to prepare the beverage or liquid food; and
referencing means for positioning and referencing the capsule in a removable manner in the device and in operational relationship with the water feed means and along an axis of rotation in the centrifugal rotating means; and
a capsule comprising a cup-shaped body having a sidewall, a bottom wall, a lid or membrane sealed to the sidewall and means for connecting the capsule to the driving means in a removable manner wherein the connecting means comprise a gripping structure of a toothed structure or a series of protrusions or recessed elements on an outer surface of the enclosure, with the gripping structure having a shape that is complementary to an engaging structure present on the driving means so that the capsule gripping structure locks into the engaging structure of the driving means to fulfil both a gearing function for driving the capsule at high speeds in rotation and a safety function for ensuring that only capsules with the gripping structure can be used and brewed successfully in the centrifugal brewing device, wherein the engaging means also offers resistance to torque during rotation of the capsule for maintaining the capsule in a reference rotational position.

17. The system according to claim 16, wherein the connecting means of the capsule comprises a toothed structure associated with the capsule.

18. The system according to claim 16, wherein the capsule has a plastic lid resiliably attached to a cup-shaped body, wherein the lid and body are attached via a radial deflectable sealing means which opens when experiencing centrifugal forces to let the beverage or food liquid leave the capsule.

19. The system according to claim 18, wherein the deflectable sealing means comprises at least one peripheral plastic lip engaging in a seat.

20. The system according to claim 16, wherein the capsule has a plastic lid welded on a cup-shaped body and wherein radial outlets are provided on the lid or body for allowing the beverage or liquid food to leave the capsule.

21. The capsule of claim 14, further comprising means for engaging the capsule to external rotational driving means of a centrifugal brewing device, the engaging means comprising a gripping structure of a toothed structure or a series of elements in relief or hollow on an outer surface of the enclosure, with the gripping structure having a shape that is complementary to an engaging structure of the driving means so that the capsule gripping structure frictionally engages or receives the engaging structure of the driving means to fulfil both a gearing function for driving the capsule at high speeds in rotation and a safety function for ensuring that only capsules with the gripping structure can be used and brewed successfully in the centrifugal brewing device, wherein the engaging means also offers resistance to torque during rotation of the capsule for maintaining the capsule in a reference rotational position.

22. The capsule of claim 16, wherein the tooth structure comprises a series of teeth positioned below the rim of the body of the capsule.

* * * * *